(12) United States Patent
Yamamoto

(10) Patent No.: US 12,325,132 B2
(45) Date of Patent: Jun. 10, 2025

(54) PRIMARY-AND-SECONDARY ROBOT SYSTEM

(71) Applicant: DENSO WAVE INCORPORATED, Aichi-Pref. (JP)

(72) Inventor: Yosuke Yamamoto, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 218 days.

(21) Appl. No.: 18/153,021

(22) Filed: Jan. 11, 2023

(65) Prior Publication Data

US 2023/0226686 A1 Jul. 20, 2023

(30) Foreign Application Priority Data

Jan. 19, 2022 (JP) .................................. 2022-006679

(51) Int. Cl.
*B25J 9/16* (2006.01)
*B25J 13/08* (2006.01)

(52) U.S. Cl.
CPC ............. *B25J 9/163* (2013.01); *B25J 9/1664* (2013.01); *B25J 13/088* (2013.01)

(58) Field of Classification Search
CPC .................................. B25J 3/00; B25J 9/1682
See application file for complete search history.

(56) References Cited

U.S. PATENT DOCUMENTS

| | | | | |
|---|---|---|---|---|
| 5,784,542 | A * | 7/1998 | Ohm | A61B 34/35 901/34 |
| 11,878,423 | B2 * | 1/2024 | Hashimoto | B25J 9/1664 |
| 11,992,455 | B1 * | 5/2024 | Akiona | A61H 7/004 |
| 2015/0148952 | A1 * | 5/2015 | Shiratsuchi | B25J 9/1682 901/3 |
| 2015/0360365 | A1 * | 12/2015 | Fudaba | B25J 9/1679 700/254 |
| 2017/0001301 | A1 | 1/2017 | Kamiya | |
| 2017/0050310 | A1 * | 2/2017 | Kanaoka | B25J 13/088 |
| 2018/0243910 | A1 * | 8/2018 | Hashimoto | H04N 7/181 |
| 2018/0345492 | A1 * | 12/2018 | Watanabe | B25J 9/044 |
| 2020/0198120 | A1 * | 6/2020 | Hashimoto | B25J 19/02 |
| 2021/0316454 | A1 * | 10/2021 | Hashimoto | B25J 3/00 |
| 2022/0063091 | A1 * | 3/2022 | Hasunuma | B25J 3/04 |
| 2023/0415353 | A1 * | 12/2023 | Oba | B25J 19/021 |
| 2024/0083031 | A1 * | 3/2024 | Falco | B25J 9/1674 |
| 2024/0198509 | A1 * | 6/2024 | Campolo | B25J 9/1633 |

FOREIGN PATENT DOCUMENTS

JP 2019-55458 A 4/2019

* cited by examiner

*Primary Examiner* — Ryan Rink
(74) *Attorney, Agent, or Firm* — Oliff PLC

(57) ABSTRACT

Provided is a primary-and-secondary robot system including: a primary robot whose posture is changed by external force applied by a user; a secondary robot whose posture is controlled to be the same as the posture of the primary robot; and a control unit that is configured to control the primary robot and the secondary robot, the control unit causing the posture of the primary robot to be the same as the posture of the secondary robot, and limiting an acceleration rate of a movement of the primary robot to a limited acceleration rate or lower in causing the posture of the primary robot to be the same as the posture of the secondary robot.

8 Claims, 8 Drawing Sheets

PRIMARY

| AXIS | ANGLE OF AXIS |
|------|---------------|
| J1   | θ1            |
| J2   | θ2            |
| J3   | θ3            |
| J4   | θ4            |
| J5   | θ5            |
| J6   | θ6            |

DATA OF AXIS

SECONDARY

| AXIS | ANGLE OF AXIS |
|------|---------------|
| J1   | θ1            |
| J2   | θ2            |
| J3   | θ3            |
| J4   | θ4            |
| J5   | θ5            |
| J6   | θ6            |

FIG.4

| PRIMARY AFTER MOVEMENT | | | PRIMARY | | | SECONDARY | |
|---|---|---|---|---|---|---|---|
| AXIS | ANGLE OF AXIS | | AXIS | ANGLE OF AXIS | | AXIS | ANGLE OF AXIS |
| J1 | $\theta 1 + b1$ | | J1 | $\theta 1$ | | J1 | $\theta 1 + b1$ |
| J2 | $\theta 2 + b2$ | DISCREPANCY-ELIMINATING MOVEMENT | J2 | $\theta 2$ | | J2 | $\theta 2 + b2$ |
| J3 | $\theta 3 + b3$ | ⇐ | J3 | $\theta 3$ | ⇔ | J3 | $\theta 3 + b3$ |
| J4 | $\theta 4 + b4$ | | J4 | $\theta 4$ | DISCREPANCY | J4 | $\theta 4 + b4$ |
| J5 | $\theta 5 + b5$ | | J5 | $\theta 5$ | | J5 | $\theta 5 + b5$ |
| J6 | $\theta 6 + b6$ | | J6 | $\theta 6$ | | J6 | $\theta 6 + b6$ |

| AXIS | DISCREPANCY AMOUNT OF AXIS |
|---|---|
| J1 | b1 |
| J2 | b2 |
| J3 | b3 |
| J4 | b4 |
| J5 | b5 |
| J6 | b6 |

DISCREPANCY-ELIMINATING OPERATION

PRIMARY-AND-SECONDARY ROBOT SYSTEM

CROSS-REFERENCE TO RELATED APPLICATION

This application is based on and claims the benefit of priority from earlier Japanese Patent Application No. 2022-006679 filed Jan. 19, 2022, the description of which is incorporated herein by reference.

BACKGROUND OF THE INVENTION

Technical Field of the Invention

The present disclosure relates to a primary-and-secondary robot system including a primary robot whose posture is changed by external force applied by a user, and a secondary robot whose posture is controlled to be the same as the posture of the primary robot.

Related Art

Hitherto, there has been provided a robot-teaching system that switches a direct control mode and an advanced control mode to each other (Japanese Patent Application Laid-open No. 2019-55458). In the direct control mode, a posture of a target robot is controlled so that the posture of the target robot is the same as a posture of an operating robot operated by an operator. In the advanced control mode, if a magnitude of external force to the operating robot, the magnitude having been detected by a detection unit, has exceeded a preset threshold, the posture of the target robot is controlled in preset movement units in a direction of the detected external force. In the teaching system disclosed in Japanese Patent Application Laid-open No. 2019-55458, in the advanced control mode, if there is a discrepancy between the posture of the operating robot and the posture of the target robot, the posture of the operating robot is caused to be the same as the posture of the target robot.

SUMMARY

However, in the teaching system disclosed in Japanese Patent Application Laid-open No. 2019-55458, at the time when the posture of the operating robot (also referred to as a "primary robot") is caused to be the same as the posture of the target robot (also referred to as a "secondary robot"), the posture of the operating robot may be rapidly changed, and the operator (also referred to as a "user") may feel a sense of discomfort.

The present disclosure has been made to solve such a problem, and a main object thereof is to prevent a user from feeling a sense of discomfort in causing a posture of a primary robot to be the same as a posture of a secondary robot in a primary-and-secondary robot system.

According to an embodiment of the present disclosure, there is provided a primary-and-secondary robot system comprising:

a primary robot whose posture is changed by external force applied by a user;

a secondary robot whose posture is controlled to be the same as the posture of the primary robot; and a control unit that is configured to control the primary robot and the secondary robot, the control unit causing the posture of the primary robot to be the same as the posture of the secondary robot, and limiting an acceleration rate of a movement of the primary robot to a limited acceleration rate or lower in causing the posture of the primary robot to be the same as the posture of the secondary robot.

BRIEF DESCRIPTION OF THE DRAWINGS

In the accompanying drawings:

FIG. 4 includes tables showing the respective angles of the axes after a discrepancy-elimination operation;

DETAILED DESCRIPTION OF THE PREFERRED EMBODIMENTS

Now, an embodiment in which a primary-and-secondary robot system including a primary robot, a secondary robot, and a control unit is embodied is described with reference to the drawings.

Figure 1:
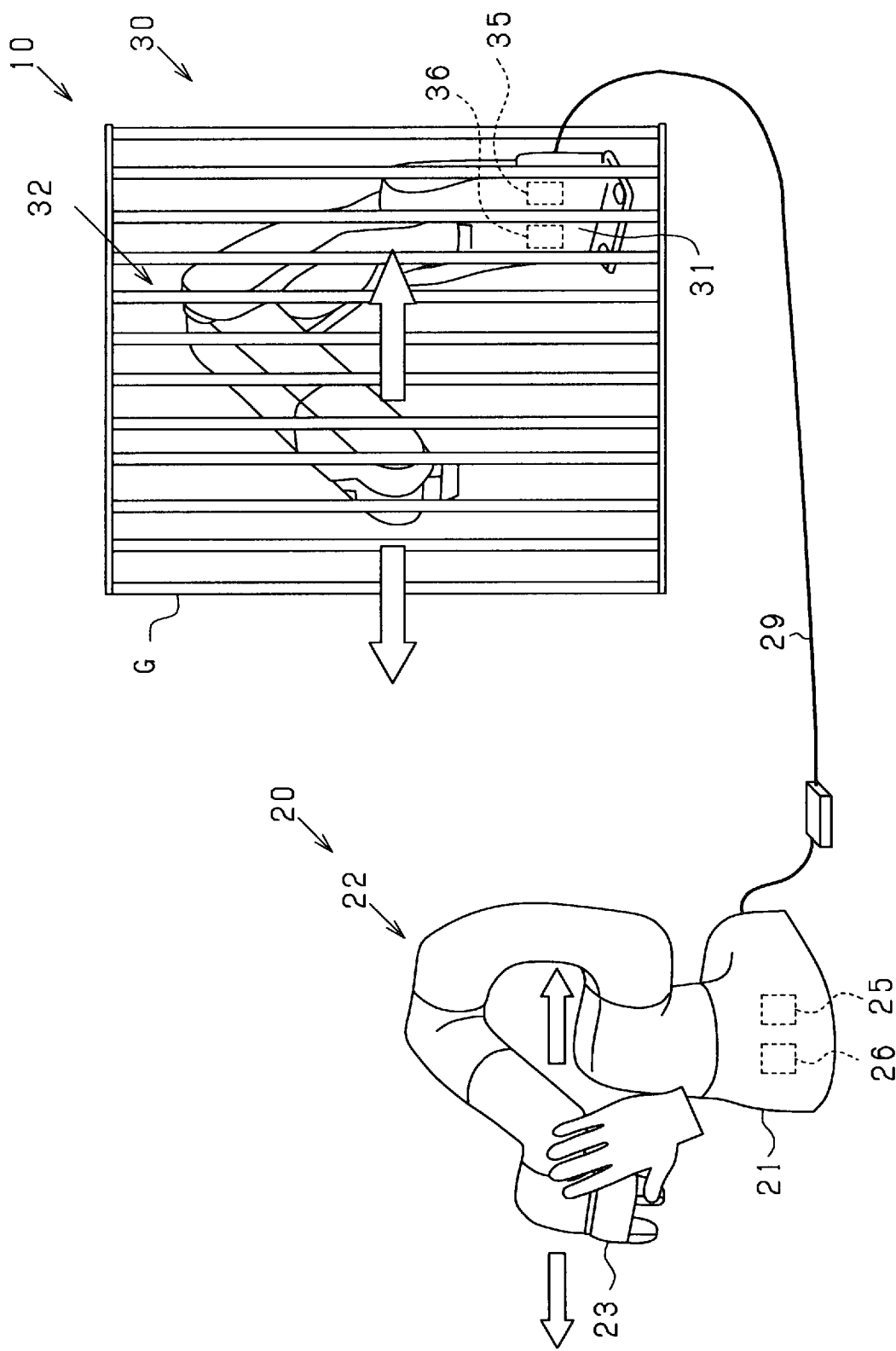
FIG. 1 is a schematic view of a primary-and-secondary robot system.

As illustrated in FIG. 1, a primary-and-secondary robot system 10 includes a primary robot 20 and a secondary robot 30.

The primary robot 20, which is, for example, a six-axis perpendicular articulated robot, includes a base 21 and an arm 22. Adjacent links of the arm 22 are coupled with joints to each other to be rotatable relative to each other. The joints (that is, axes) are driven respectively by motors corresponding respectively to the joints.

A hand 23 is attached to a distal end of the arm 22. The hand 23 includes a pair of claws, and makes an opening-and-closing movement to widen and narrow a gap between the pair of claws.

A storage unit 25 that is configured to store results (for example, a history) of fine-adjustment operations described below, and a control unit 26 that is configured to control movements of the primary robot 20 and the hand 23 are provided in the base 21. A computer including a CPU (Central Processing Unit), a ROM (Read Only Memory), a RAM (Random Access Memory), a drive circuit, and an input-and-output interface is provided as the control unit 26.

Encoders (not shown) that are configured to detect respective rotation angles of the joints of the primary robot 20 are provided respectively to these joints. In other words, the encoders detect positions and directions of a control point of the arm 22 (hereinafter, referred to as a "posture of the arm 22"). The control point is selectable from a center of the distal end of the arm 22 and a midpoint between the pair of claws (TCP: Tool Center Position).

Brakes (not shown) are provided respectively in the joints of the primary robot 20. The brakes respectively brake the joints so as to suppress changes of the respective angles of the joints.

The control unit 26 controls the posture of the arm 22 in accordance with external force that is applied to the arm 22. Specifically, the control unit 26 performs flexible control to move the arm 22 in accordance with the external force by causing the respective motors of the joints to generate torque that compensates for only gravity and frictional force to be applied to the arm 22. Also, the control unit 26 maintains the posture of the arm 22 as of a time point when the application of the external force to the arm 22 is stopped. In other words, the primary robot 20 is capable of changing the posture of the arm 22 with use of the external force that is applied by a user, and of maintaining the posture. In this embodiment, in a direct teaching mode, the user can directly grip and move the arm 22, and the posture of the arm 22 can be maintained. The control unit 26 transmits results of the detection by the respective encoders of the joints of the primary robot 20 to a control unit 36 of the secondary robot 30.

The secondary robot 30 is connected to the primary robot 20 via a cable 29. The secondary robot 30 is, for example, of the same type as that of the primary robot 20 (for example, the six-axis perpendicular articulated type), and is larger in size than the primary robot 20. The secondary robot 30 is installed within a safety fence G. The secondary robot 30 has the same configuration as that of the primary robot 20 except being larger in size than the primary robot 20 and slightly different in shape from the primary robot 20. The secondary robot 30 includes a base 31 and an arm 32. A hand (not shown) is attached to a distal end of the arm 32. Joints of the secondary robot 30 correspond respectively to the joints of the primary robot 20.

The control unit 36 that is configured to control movements of the secondary robot 30 and the hand is provided in the base 31. The computer including a CPU, a ROM, a RAM, a drive circuit, and an input-and-output interface is provided as the control unit 36. The control unit 26 and the control unit 36 are communicable with each other via the cable 29, and exchanges information with each other.

Encoders (not shown) that are configured to detect respective rotation angles of the joints (that is, axes) of the secondary robot 30 are provided respectively to these joints. In other words, the encoders detect positions and directions of a control point of the arm 32 (hereinafter, referred to as a "posture of the arm 32"). The control point is selectable from a center of the distal end of the arm 32 and, for example, a midpoint between a pair of claws (TCP).

Brakes (not shown) are provided respectively in the joints of the secondary robot 30. The brakes respectively brake the joints so as to suppress changes of the respective angles of the joints.

The control unit 36 controls the respective motors of the joints of the secondary robot 30 so that the respective angles of the joints of the secondary robot 30 are caused to be the same as the respective angles of the corresponding joints of the primary robot 20. In other words, in response to an operation by the user to apply the external force to the primary robot 20, the posture of the primary robot 20 is changed. Then, the control unit 36 performs control to cause the posture of the secondary robot 30 to be the same as the posture of the changed posture of the primary robot 20 (hereinafter, referred to as a "primary-and-secondary robot operation").

Specifically, the control unit 36 performs feedback control of the respective motors of the joints of the secondary robot 30 on the basis of the results of the detection by the respective encoders of the joints of the primary robot 20 and results of the detection by the respective encoders of the joints of the secondary robot 30. In other words, the joints of the secondary robot 30 move respectively in conjunction with the joints of the primary robot 20. In still other words, the secondary robot 30 follows the movement of the primary robot 20. The control unit 36 transmits the results of the detection by the respective encoders of the joints of the secondary robot 30 to the control unit 26 of the primary robot 20. Note that, the control unit 26 of the primary robot 20 and the control unit 36 of the secondary robot 30 serve as a control unit of the primary-and-secondary robot system 10.

Figure 2:
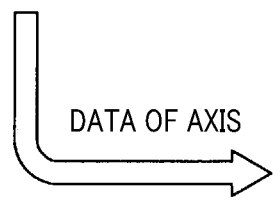
FIG. 2 includes tables showing respective angles of axes at a time when a primary-and-secondary robot operation is performed.

As shown in FIG. 2, by the primary-and-secondary robot operation, respective angles $\theta 1$ to $\theta 6$ of the axes of the secondary robot 30 are caused to be the same as respective angles $\theta 1$ to $\theta 6$ of the axes of the primary robot 20.

Figure 3:
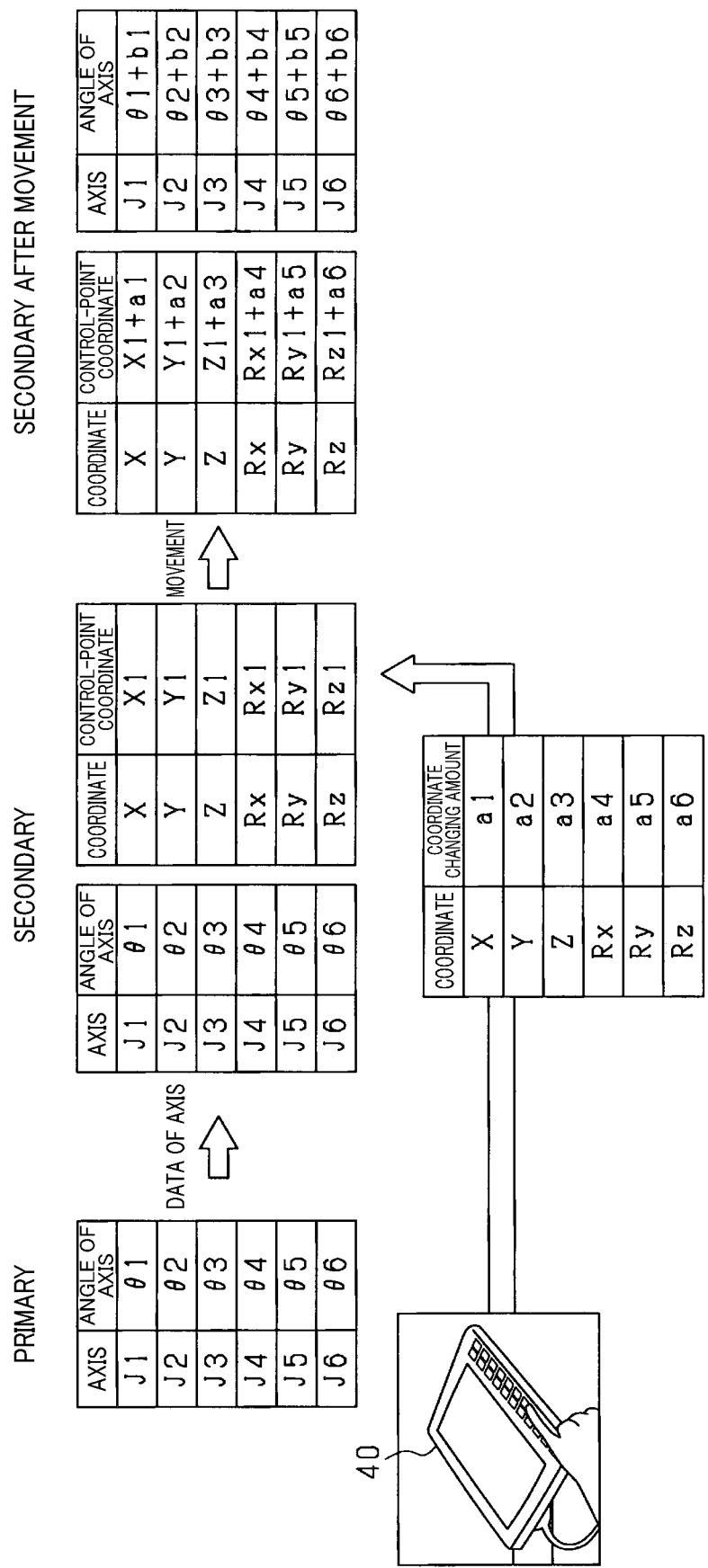
FIG. 3 includes tables showing the respective angles of the axes after an inching movement.

An operating device 40 as shown in FIG. 3 is connected to the primary robot 20. The operating device 40 is, for example, a teach pendant, a tablet terminal, a smartphone, a notebook PC (Personal Computer), or a desktop PC. Note that, the operating device 40 is preferred to include a dead man's switch so that the secondary robot 30 is stopped in response to pressing of the dead man's switch by the user or releasing of the dead man's switch by the user.

The operating device 40 enables the user to perform an operation to cause the arm 32 of the secondary robot 30 to make inching movements by which the arm 32 is moved in minimum units or fine units. By operating the operating device 40, the user can set units in which the posture of the arm 32 is changed, for example, to 0.1 to 1.0 (mm). By operating the operating device 40, the user can cause the arm 32 to make the inching movements by which the posture of the arm 32 is changed in the preset units via the control units 26 and 36 (hereinafter, referred to as the "fine-adjustment operations"). At this time, the control unit 26 causes the storage unit 25 to store the results (for example, the history) of the fine-adjustment operations. Note that, the operating device 40, the storage unit 25, the control unit 26, and the control unit 36 are also collectively referred to as a "fine-adjustment unit." In other words, under a state in which the control to cause the posture of the secondary robot 30 to be the same as the posture of the primary robot 20 is not performed, the fine-adjustment unit controls the posture of the secondary robot 30 in response to the fine-adjustment operations by the user, and stores the results (for example, the history) of the fine-adjustment operations.

While the user is performing the fine-adjustment operations with use of the operating device 40, the control unit 26 does not allow the posture of the primary robot 20 to be changed by the external force applied by the user. Specifically, while the user is performing the fine-adjustment operations with use of the operating device 40, the control unit 26 actuates the respective brakes of the joints of the primary robot 20 so as to disable the changes of the respective angles of the joints. Note that, the control unit 26 is also capable of disabling the changes of the respective angles of the joints by performing control to maintain the respective angles of the joints of the primary robot 20 while the user is performing the fine-adjustment operations with use of the operating device 40.

When the angles of axes J1 to J6 of the secondary robot 30 are respectively $\theta 1$ to $\theta 6$, coordinates (X, Y, Z, Rx, Ry, Rz) of the control point are coordinates (X1, Y1, Z1, Rx1, Ry1, Rz1). X, Y, and Z are coordinates on an X-axis, a Y-axis, and a Z-axis, respectively. Rx, Ry, and Rz are rotation angles about the X-axis, the Y-axis, and the Z-axis, respectively.

In this context, an assumption is made that the coordinates (X, Y, Z, Rx, Ry, Rz) of the control point of the secondary robot 30 are changed by (a1, a2, a3, a4, a5, a6) in response to the fine-adjustment operations by the user. At this time, the changes of the angles of the axes J1 to J6 of the primary robot 20 are disabled. The fine-adjustment operation may be a single operation, or may be a set of a plurality of operations.

As a result, the coordinates of the control point of the secondary robot 30 become coordinates (X1+a1, Y1+a2, Z1+a3, Rx1+a4, Ry1+a5, Rz1+a6). When the coordinates of the control point of the secondary robot 30 are the coordinates (X1+a1, Y1+a2, Z1+a3, Rx1+a4, Ry1+a5, Rz1+a6), the respective angles of the axes J1 to J6 of the secondary robot 30 are θ1+b1, θ2+b2, θ3+b3, θ4+b4, θ5+b5, and θ6+b6, respectively. As a result, a discrepancy arises between the respective angles of the axes J1 to J6 of the primary robot 20 and the respective angles of the axes J1 to J6 of the secondary robot 30.

Thus, as shown in FIG. 4, the control unit 26 eliminates the discrepancy between the respective angles of the axes J1 to J6 of the primary robot 20 (that is, the posture of the primary robot 20) and the respective angles of the axes J1 to J6 of the secondary robot 30 (that is, the posture of the secondary robot 30). Specifically, the control unit 26 causes the primary robot 20 to make a discrepancy-elimination movement for eliminating the discrepancy between the postures. With this, the respective angles of the axes J1 to J6 of the primary robot 20 are caused to be the same as the respective angles of the axes J1 to J6 of the secondary robot 30. At this time, if the control to cause the respective angles of the axes J1 to J6 of the primary robot 20 to be the same as the respective angles of the axes J1 to J6 of the secondary robot 30 is simply performed, the respective angles of the axes J1 to J6 of the primary robot 20 may be rapidly changed to angles that are not intended by the user, and the user may feel a sense of discomfort.

As a countermeasure, if an amount of the discrepancy between the posture of the primary robot 20 and the posture of the secondary robot 30 has exceeded a preset amount of the discrepancy, the control unit 26 notifies the user of the excess. The operating device 40 is capable of instructing the control unit 26 to cause the posture of the primary robot 20 to be the same as the posture of the secondary robot 30. Then, if the user performs a discrepancy-elimination operation to eliminate the discrepancy between the posture of the primary robot 20 and the posture of the secondary robot 30 (the instruction to cause the posture of the primary robot 20 to be the same as the posture of the secondary robot 30), the control unit 26 causes the primary robot 20 to make the discrepancy-elimination movement. In addition, in order to eliminate the discrepancy between the posture of the primary robot 20 and the posture of the secondary robot 30, the control unit 26 limits an acceleration rate at which the primary robot 20 is moved to a limited acceleration rate Au or lower.

Figure 5:
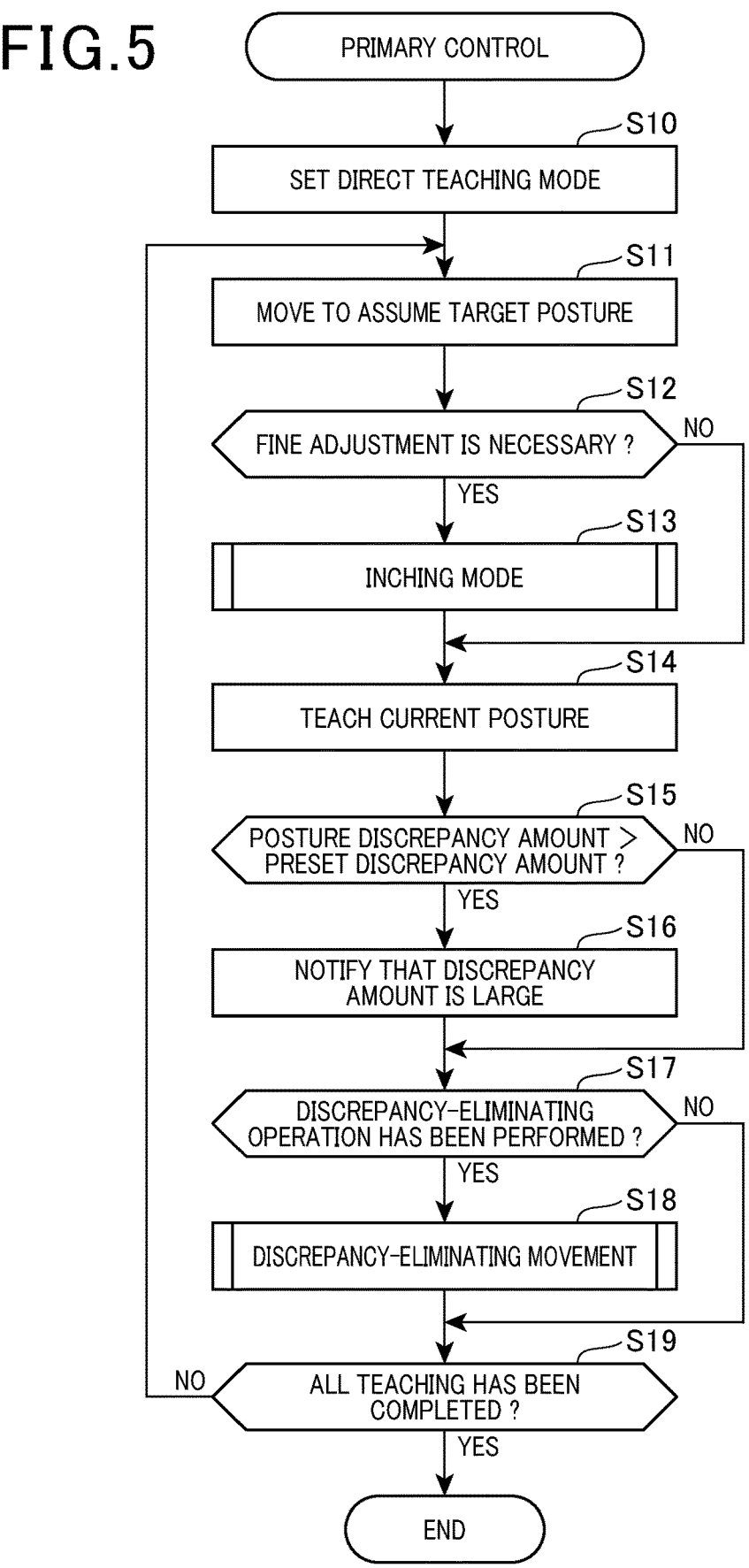
FIG. 5 is a flowchart showing a procedure of primary control.

FIG. 5 is a flowchart showing a procedure of primary control that is performed by the control unit 26 of the primary robot 20.

First, the control unit 26 sets a mode of the primary robot 20 to the direct teaching mode (S10). In the direct teaching mode, the primary robot 20 is moved in response to the operation by the user to assume a target posture (S11). Note that, the target posture means a posture of the primary robot 20 in a state in which the control point of the secondary robot 30 has reached a teaching point, or in a state in which the control point of the secondary robot 30 has reached a vicinity of the teaching point.

At this time, the control unit 26 transmits, as teaching information to the control unit 36, information that enables the posture of the primary robot 20 to be specified (such as the respective rotation angles of the motors), the posture having been changed by the user. The teaching information to be transmitted at this time also includes information indicating that the teaching in the direct teaching mode is being performed.

Figure 6:
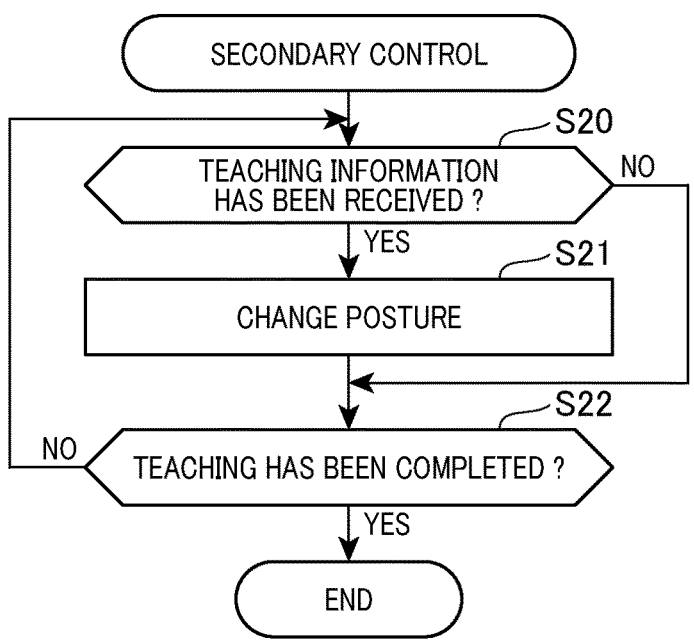
FIG. 6 is a flowchart showing a procedure of secondary control.

Meanwhile, in response to the start of the teaching of the primary robot 20, as shown in FIG. 6, the control unit 36 of the secondary robot 30 determines whether the teaching information has been received from the control unit 26 (S20). If the control unit 36 determines that the teaching information has not been received (NO in S20), the control unit 36 determines whether the teaching has been completed (S22). If the control unit 36 determines that the teaching has not been completed (NO in S22), a procedure returns to S20. Meanwhile, if the control unit 36 determines that the teaching has been completed (YES in S22), the control unit 36 ends the procedure of secondary control (END).

If the control unit 36 determines that the teaching information has been received from the control unit 26 (YES in S20), the control unit 36 changes the posture of the secondary robot 30 on the basis of the teaching information (S21). At this time, if the primary robot 20 is moved in the direct teaching mode, the control unit 36 receives the teaching information every time the posture of the primary robot 20 is changed by the user. The control unit 36 changes the posture of the secondary robot 30 in conjunction with the changes of the posture of the primary robot 20.

Referring back to FIG. 5, in response to the movement of the primary robot 20 to assume the target posture, depending on whether a current posture of the primary robot 20 is correct in other words, whether the fine adjustment, i.e., precise positioning is necessary, the control unit 26 determines whether a switchover to an inching mode has been made (S12). Then, if the control unit 26 determines that the fine adjustment is unnecessary, that is, the switchover to the inching mode is not performed (NO in S12), the control unit 26 sets the current posture of the primary robot 20 as the teaching point (S14). Hereinbelow, for the sake of convenience, a phrase "current posture" is used to refer to the current posture of the primary robot 20. Specifically, the control unit 26 sets a position and a direction of the control point in the current posture of the primary robot 20 as the teaching point. At this time, the control unit 26 transmits, as the teaching information to the control unit 36, information indicating the current posture of the primary robot 20 and indicating that this current posture is set as the teaching point.

Meanwhile, if the user inputs an operation of the switchover to the inching mode via the operating device 40, that is, if the fine adjustment is necessary (YES in S12), the control unit 26 sets the mode of the primary robot 20 to the inching mode (S13).

Figure 7:
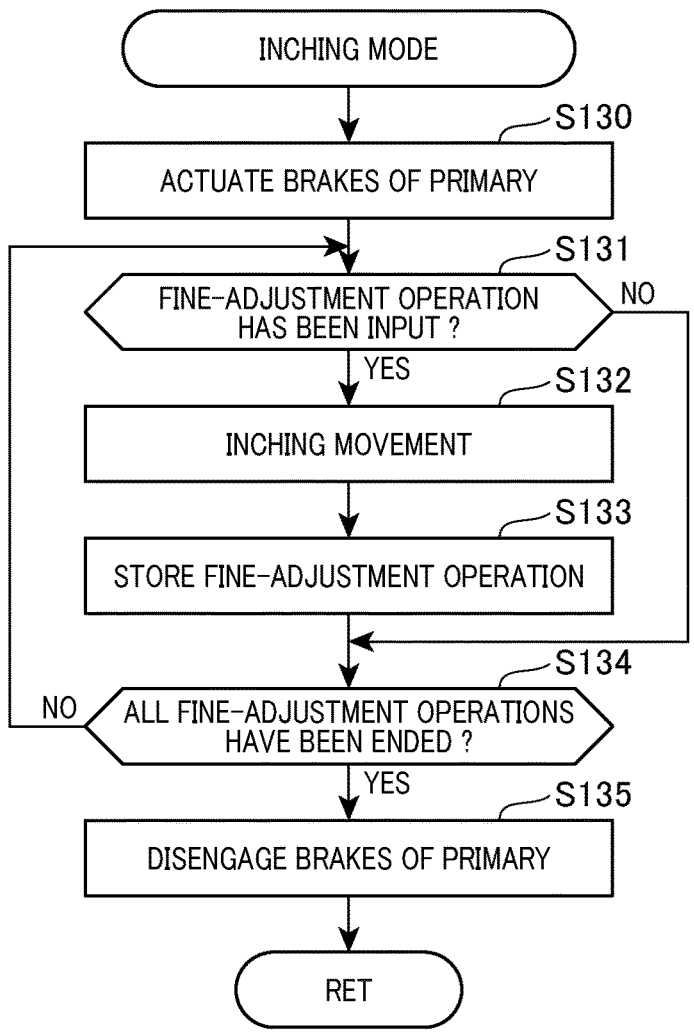
FIG. 7 is a flowchart showing a procedure in an inching mode.

FIG. 7 is a flowchart showing a procedure of processes in the inching mode. A series of these processes is executed by the control unit 26.

The control unit 26 actuates the respective brakes of the axes J1 to J6 of the primary robot 20 (S130). The control unit 26 determines whether the fine-adjustment operation has been input (S131). If the control unit 26 determines that the fine-adjustment operation has not been input (NO in S131), the control unit 26 determines whether all the fine-adjustment operations have been ended (S134). Specifically, in response to an operation by the user to end the inching mode via the operating device 40, the control unit 26 determines that all the fine-adjustment operations have been ended. If the control unit 26 determines that not all the fine-adjustment operations have been ended (NO in S134), the procedure returns to S131.

Meanwhile, if the control unit 26 determines in S131 that the fine-adjustment operation has been input (YES in S131), the control unit 26 causes the arm 32 to make the inching movement (S132). Specifically, in response to the input fine-adjustment operation, the control unit 26 changes the posture of the arm 32 in the preset units via the control unit 36. In the fine-adjustment operation, every time the user presses a button of the operating device 40, the posture of the secondary robot 30 is changed in the preset units. Pressing and holding the button is detected as a single press.

Then, the control unit 26 causes the storage unit 25 to store the input fine-adjustment operation (S133). Specifically, the control unit 26 causes the storage unit 25 to store in time series the fine-adjustment operations that are input after the switchover to the inching mode (made the inching movements).

If the control unit 26 determines in S134 that all the fine-adjustment operations have been ended (YES in S134), the control unit 26 disengages the respective brakes of the axes J1 to J6 of the primary robot 20 (S135). Next, the procedure proceeds to the processes subsequent to S13 in FIG. 5 (RET).

Referring back to FIG. 5, after the process of S14, the control unit 26 determines whether the amount of the discrepancy between the posture of the primary robot 20 and the posture of the secondary robot 30 has exceeded the preset discrepancy amount (S15). Specifically, if the secondary robot 30 has been moved more than 1.0 (cm) by the inching movements, the control unit 26 determines that the amount of the discrepancy has exceeded the preset discrepancy amount. Note that, at the time of the primary-and-secondary robot operation, the posture of the primary robot 20 and the posture of the secondary robot 30 may be regarded as being the same as each other. In addition, the control unit 26 may determine that the amount of the discrepancy has exceeded the preset discrepancy amount on the basis of differences between the respective angles of the axes of the primary robot 20 and the corresponding respective angles of the axes of the secondary robot 30.

If the control unit 26 determines in S15 that the amount of the discrepancy between the posture of the primary robot 20 and the posture of the secondary robot 30 has exceeded the preset discrepancy amount (YES in S15), the control unit 26 notifies the user that the amount of the discrepancy between the posture of the primary robot 20 and the posture of the secondary robot 30 is large (S16). For example, the control unit 26 may cause a display unit of the operating device 40 to display the notification that the amount of the discrepancy is large, or may cause a speaker of the operating device 40 to announce that the amount of the discrepancy is large. Meanwhile, if the control unit 26 determines in S15 that the amount of the discrepancy between the posture of the primary robot 20 and the posture of the secondary robot 30 has not exceeded the preset discrepancy amount (NO in S15), the procedure proceeds to S17. In other words, if the control unit 26 determines that the amount of the discrepancy between the posture of the primary robot 20 and the posture of the secondary robot 30 has not exceeded the preset discrepancy amount, the control unit 26 continues the primary-and-secondary robot operation even under a state in which a discrepancy has arisen between the posture of the primary robot 20 and the posture of the secondary robot 30.

The control unit 26 determines whether the user has performed the discrepancy-elimination operation via the operating device 40 (S17). If the control unit 26 determines that the user has performed the discrepancy-elimination operation via the operating device 40 (YES in S17), the control unit 26 causes the primary robot 20 to make the discrepancy-elimination movement (S18).

Figure 8:
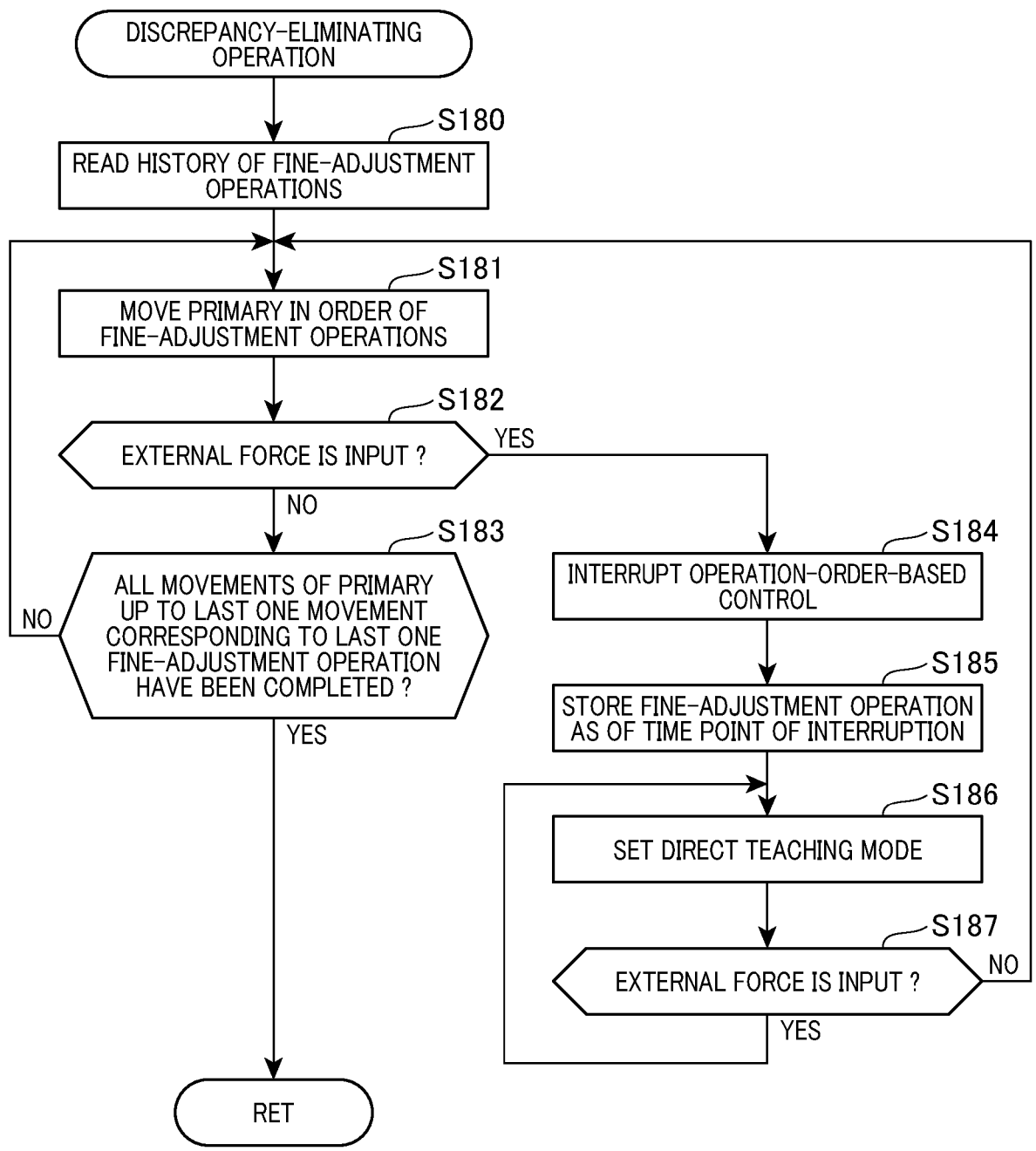
FIG. 8 is a flowchart showing a procedure of a discrepancy-elimination movement.

FIG. 8 is a flowchart showing a procedure of processes of the discrepancy-elimination movement. A series of these processes is executed by the control unit 26.

The control unit 26 reads the history of the fine-adjustment operations from the storage unit 25 (S180). The control unit 26 causes the primary robot 20 to move in an order of the fine-adjustment operations (S181). Specifically, the control unit 26 performs control to cause the posture of the primary robot 20 to be the same as the posture of the secondary robot 30 in the order of the fine-adjustment operations in the stored history (hereinafter, referred to as "operation-order-based control"). More specifically, the control unit 26 causes the primary robot 20 to make movements corresponding to the inching movements in the same order as an order in which the secondary robot 30 has made the inching movements. At this time, the control unit 26 limits the acceleration rate at which the primary robot 20 is moved, specifically, an acceleration rate at a time when the control point is moved to the limited acceleration rate Au or lower. In addition, the control unit 26 limits a velocity at which the primary robot 20 is moved, specifically, a velocity at a time when the control point is moved to a velocity limit Vu or lower.

The control unit 26 determines whether the user is applying the external force to the primary robot 20 while the control unit 26 is performing the operation-order-based control (S182). If the control unit 26 determines that the user is applying the external force to the primary robot 20 while the control unit 26 is performing the operation-order-based control (YES in S182), the control unit 26 interrupts the operation-order-based control (S184). Then, the control unit 26 stores one fine-adjustment operation of the fine-adjustment operations, the stored fine-adjustment operation corresponding to one movement of the movements of the primary robot 20 as of a time point of the interruption of the operation-order-based control (S185).

Then, the control unit 26 sets the direct teaching mode (S186). The control unit 26 determines whether the user is applying the external force to the primary robot 20 (S187). If the control unit 26 determines that the user is applying the external force to the primary robot 20 (YES in S187), the procedure returns to S186.

Meanwhile, if the control unit 26 determines in S187 that the user is not applying the external force to the primary robot 20 (NO in S187), the procedure returns to S181. In this case, in the process of S181, the control unit 26 causes the primary robot 20 to move sequentially from the stored fine-adjustment operation corresponding to one movement of the primary robot 20 as of the time point of the interruption, the stored fine-adjustment operation being stored in the process of S185. In other words, if the control unit 26 determines that the user is not applying the external force to the primary robot 20 after the interruption of the operation-order-based control, the control unit 26 restarts the operation-order-based control from the time point of the interruption.

In addition, if the control unit 26 determines in the process of S182 that the user is not applying the external force to the primary robot 20 while the control unit 26 is performing the operation-order-based control (NO in S182), the control unit 26 determines whether all the movements of the primary robot 20 up to a last one movement of the movements have been completed, the last one movement corresponding to a last one fine-adjustment operation of the fine-adjustment operations in the history of the fine-adjustment operations (S183). If the control unit 26 determines that not all the movements of the primary robot 20 up to the last one movement corresponding to the last one fine-adjustment operation have been completed (NO in S183), the procedure returns to S181. Meanwhile, if the control unit 26 determines in S183 that all the movements of the primary robot 20 up to the last one movement corresponding to the last one fine-adjustment operation have been completed (YES in S183), the procedure returns to the process subsequent to S19 in FIG. 5 (RET). Note that, the processes of S182 and S187 correspond to processes by a determination unit.

The control unit 26 determines in the process of S19 in FIG. 5 whether all the teaching has been completed (S19). For example, in response to an operation by the user to end the teaching via the operating device 40, the control unit 26 determines that all the teaching has been completed. If the control unit 26 determines that not all the teaching has been completed (NO in S19), the procedure returns to S11. Meanwhile, if the control unit 26 determines that all the teaching has been completed (YES in S19), the control unit 26 ends the procedure of primary control (END).

The embodiment described above in detail provides the following advantages.

The primary-and-secondary robot system 10 includes the primary robot 20 whose posture is changed by the external force applied by the user, the secondary robot 30 whose posture is controlled to be the same as the posture of the primary robot 20, and the control unit 26 that is configured to control the primary robot 20 and the secondary robot 30. The control unit 26 causes the posture of the primary robot 20 to be the same as the posture of the secondary robot 30, and limits the acceleration rate of the movement of the primary robot 20 to the limited acceleration rate Au or lower in causing the posture of the primary robot 20 to be the same as the posture of the secondary robot 30.

According to the above-described configuration, the primary-and-secondary robot system 10 includes the primary robot 20 whose posture is changed by the external force applied by the user, the secondary robot 30 whose posture is controlled to be the same as the posture of the primary robot 20, and the control unit 26 that is configured to control the primary robot 20 and the secondary robot 30. Thus, in response to the operation by the user to change the posture of the primary robot 20 by applying the external force to the primary robot 20, the posture of the primary robot 20 is changed. Then, the posture of the secondary robot 30 is controlled to be the same as the posture of the primary robot 20. In other words, in response to the operation by the user to change the posture of the primary robot 20, the posture of the secondary robot 30 can be changed.

Note that, if the posture of the secondary robot 30 is finely adjusted alone under the state in which the control to cause the posture of the secondary robot 30 to be the same as the posture of the primary robot 20 is not performed, a discrepancy arises between the posture of the primary robot 20 and the posture of the secondary robot 30. In addition, if a type or a shape of the primary robot 20 and a type or a shape of the secondary robot 30 are different from each other, along with the primary-and-secondary robot operation, a discrepancy may arise between the posture of the primary robot 20 and the posture of the secondary robot 30. In these cases, if the control to cause the posture of the primary robot 20 to be the same as the posture of the secondary robot 30 is performed, the posture of the primary robot 20 may be rapidly changed. The user who operates the primary robot 20 may feel a sense of discomfort from the rapid change of the posture of the primary robot 20.

As a countermeasure, the control unit 26 causes the posture of the primary robot 20 to be the same as the posture of the secondary robot 30, and the control unit 26 limits the acceleration rate of the movement of the primary robot 20 to the limited acceleration rate Au or lower in causing the posture of the primary robot 20 to be the same as the posture of the secondary robot 30. With this, a velocity of the movement of the primary robot 20 can be suppressed from being rapidly changed, resulting in suppressing the posture of the primary robot 20 from being rapidly changed. Thus, even when the posture of the primary robot 20 is changed in causing the posture of the primary robot 20 to be the same as the posture of the secondary robot 30, the user can be prevented from feeling a sense of discomfort. For example, the posture of the primary robot 20 and the posture of the secondary robot 30 can be caused to be the same as each other without surprising the user.

In causing the posture of the primary robot 20 to be the same as the posture of the secondary robot 30, the control unit 26 further limits the velocity of the movement of the primary robot 20 to the velocity limit Vu or lower. Such a configuration enables the posture of the primary robot 20 to be suppressed from changing such that the velocity of the primary robot 20 exceeds the velocity limit Vu. With this, the user can be further prevented from feeling a sense of discomfort.

The primary-and-secondary robot system 10 further includes the fine-adjustment unit that is configured to control the posture of the secondary robot 30 in response to the fine-adjustment operations by the user and store the results of the fine-adjustment operations, under the state in which the control to cause the posture of the secondary robot 30 to be the same as the posture of the primary robot 20 is stopped. The control unit 26 causes the posture of the primary robot 20 to be the same as the posture of the secondary robot 30 on the basis of the stored results of the fine-adjustment operations. The fine-adjustment unit enables the user to perform the fine-adjustment operations to finely adjust the posture of the secondary robot 30 under the state in which the control to cause the posture of the secondary robot 30 to be the same as the posture of the primary robot 20 is stopped, and stores the history of the fine-adjustment operations. Thus, the user can finely adjust the posture of the secondary robot 30 by performing the fine-adjustment operations. At this time, since the posture of the secondary robot 30 is not caused to be the same as the posture of the primary robot 20, a discrepancy arises between the posture of the primary robot 20 and the posture of the secondary robot 30. Thus, the control unit 26 causes the posture of the primary robot 20 to be the same as the posture of the secondary robot 30 on the basis of the stored results of the fine-adjustment operations. For example, in eliminating the discrepancy between the posture of the primary robot 20 and the posture of the secondary robot 30, the control unit 26 performs the operation-order-based control to cause the posture of the primary robot 20 to be the same as the posture of the secondary robot 30 in the order of the fine-adjustment operations in the history stored in the storage unit 25. With this, the posture of the primary robot 20 is controlled in response to the fine-adjustment operations to the secondary robot 30 by the user. Thus, even when the posture of the primary robot 20 is changed in causing the posture of the primary robot 20 to be the same as the posture of the secondary robot 30, the user can be prevented from feeling a sense of discomfort.

If the control unit 26 determines that the user is applying the external force to the primary robot 20 while the control unit 26 is performing the control to cause the posture of the primary robot 20 to be the same as the posture of the secondary robot 30 (also referred to as "discrepancy-elimination control"), the control unit 26 interrupts the discrepancy-elimination control. Thus, even when the discrepancy elimination (such as the operation-order-based control) has been started, if the user applies the external force to the primary robot 20, the discrepancy-elimination control can be interrupted. Note that, the application of the external force to the primary robot 20 by the user can be intention of the user to operate the primary robot 20. Thus, during the user is applying the external force to the primary robot 20, the posture of the primary robot 20 can be suppressed from being changed to a posture that is not intended by the user. As a result, the user can be prevented from feeling a sense of discomfort.

If the control unit 26 determines that the user is not applying the external force to the primary robot 20 after the interruption of the discrepancy-elimination control, the control unit 26 restarts the discrepancy-elimination control from the time point of the interruption. Thus, if the user stops applying the external force to the primary robot 20 after the interruption of the discrepancy-elimination control, the discrepancy-elimination control can be restarted from the time point of the interruption. Thus, the posture of the primary robot 20 can be caused to be the same as the posture of the secondary robot 30 more promptly than in a case where the discrepancy-elimination control is started over.

The operating device 40 accepts the fine-adjustment operations by the user under the state in which the control to cause the posture of the secondary robot 30 to be the same as the posture of the primary robot 20 is stopped. In other words, the operating device 40 and the control units 26 and 36 enable the user to perform the fine-adjustment operations to finely adjust the posture of the secondary robot 30 under the state in which the control to cause the posture of the secondary robot 30 to be the same as the posture of the primary robot 20 is not performed. Thus, the user can finely adjust the posture of the secondary robot 30 by performing the fine-adjustment operations with use of the operating device 40.

If the amount of the discrepancy between the posture of the primary robot 20 and the posture of the secondary robot 30 has exceeded the preset amount of the discrepancy, the control unit 26 notifies that the amount of the discrepancy has exceeded the preset amount of the discrepancy. Thus, the user can realize that the amount of the discrepancy between the posture of the primary robot 20 and the posture of the secondary robot 30 has exceeded the preset amount of the discrepancy. In addition, with use of the operating device 40, the user can instruct the control unit 26 to cause the posture of the primary robot 20 to be the same as the posture of the secondary robot 30. In this case, since the user has already instructed to cause the posture of the primary robot 20 to be the same as the posture of the secondary robot 30, the user can be prevented from feeling a sense of discomfort.

The control unit 26 suppresses the posture of the primary robot 20 from being changed by the external force applied by the user while the user is performing the fine-adjustment operations with use of the operating device 40. Thus, the fine-adjustment operations with use of the operating device 40 can be performed preferentially over the primary-and-secondary robot operation. In addition, the control of the secondary robot 30 by the primary-and-secondary robot operation and the control of the secondary robot 30 by the fine-adjustment operations with use of the operating device 40 can be prevented from interfering with each other.

Note that, the above-described embodiment may be modified as follows. The same components as those of the above-described embodiment are denoted by the same reference symbols to omit redundant description.

In FIG. 7, the process of S130 and the process of S135 may be omitted.

The secondary robot 30 may include a storage unit 35 that is configured to store the history of the fine-adjustment operations, and the control unit 26 may read the history of the fine-adjustment operations, the history being stored in the storage unit 35.

If the amount of the discrepancy between the posture of the primary robot 20 and the posture of the secondary robot 30 is equal to or less than the preset amount of the discrepancy at the time of the interruption of the operation-order-based control in the process of S184 in FIG. 8, the series of the processes of the discrepancy-elimination movement in FIG. 8 may be ended. Alternatively, if the application of the external force is stopped after the interruption of the operation-order-based control in the process of S184 in FIG. 8, the primary robot 20 may be restored to a state as of a time point of the start of the discrepancy-elimination movement, and the operation-order-based control may be started over from a first one fine-adjustment operation in the history of the fine-adjustment operations, the history being stored in the storage unit 25.

Figure 9:
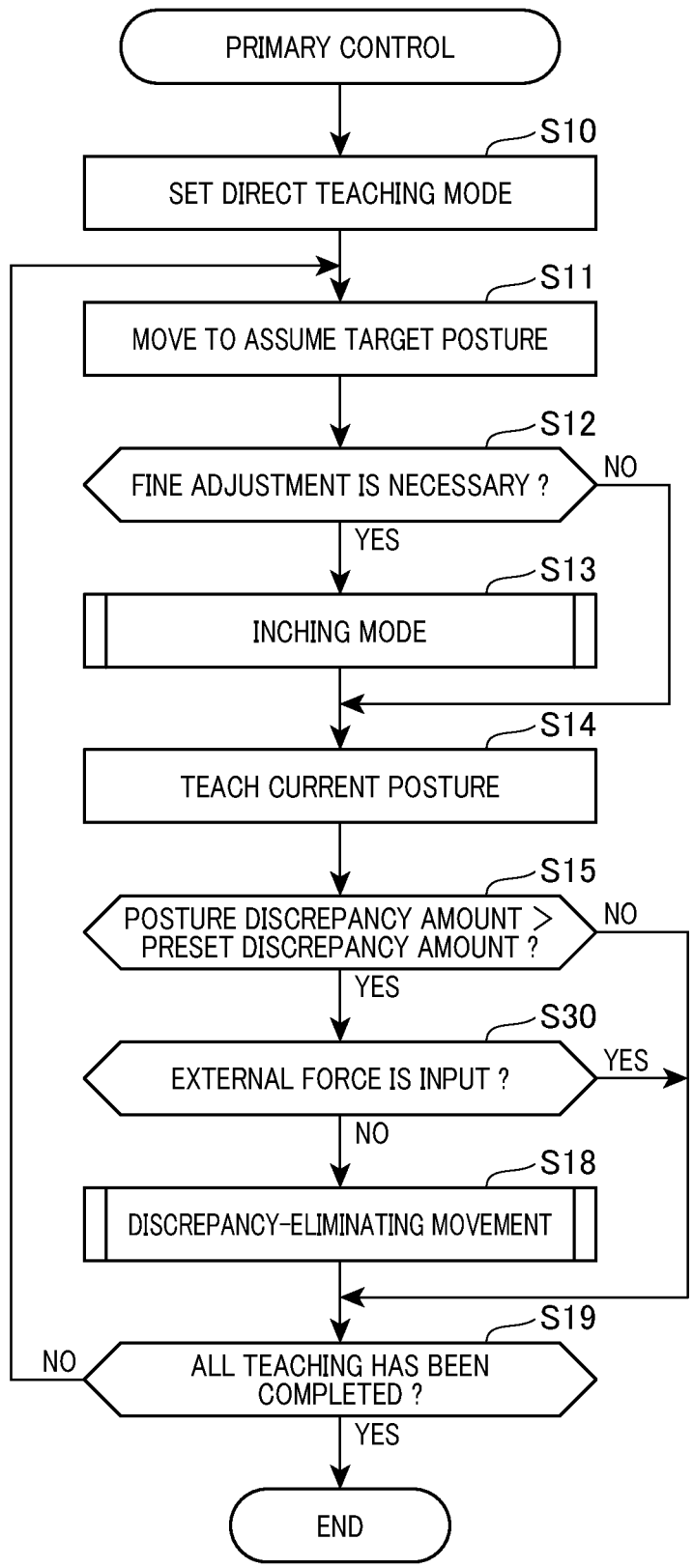
FIG. 9 is a flowchart showing a procedure of a modification of the primary control.

The primary-and-secondary robot system 10 may further include the determination unit that is configured to determine whether the user is applying the external force to the primary robot 20. If the determination unit determines that the user is not applying the external force to the primary robot 20, the control unit 26 may cause the posture of the primary robot 20 to be the same as the posture of the secondary robot 30. For example, the primary robot 20 may include the determination unit that is configured to determine whether the user is applying the external force to the primary robot 20. The determination unit determines a magnitude and a direction of the external force (and whether the external force is being applied), for example, by measuring current values of the respective motors of the joints and by calculating torque that is proportional to these current values. Then, at the time when the discrepancy between the posture of the primary robot 20 and the posture of the secondary robot 30 is eliminated, if the determination unit determines that the user is not applying the external force to the primary robot 20 (S30) as shown in FIG. 9, the control unit 26 may cause the posture of the primary robot 20 to be the same as the posture of the secondary robot 30. Note that torque sensors may be provided to the motors, and the torque may be calculated from results of detection by these torque sensors.

According to the above-described configuration, if the user is not applying the external force to the primary robot 20 (NO in S30), the posture of the primary robot 20 is caused to be the same as the posture of the secondary robot 30. Meanwhile, if the user is applying the external force to the primary robot 20 (YES in S30), the control to cause the posture of the primary robot 20 to be the same as the posture of the secondary robot 30 is not performed. Thus, under the state in which the user is applying the external force to the primary robot 20, the posture of the primary robot 20 can be suppressed from being changed to a posture that is not intended by the user. As a result, the user can be prevented from feeling a sense of discomfort. Note that, the process of S30 may be executed between the process of S17 and the process of S18 in FIG. 5.

The primary-and-secondary robot system 10 may further include a determination unit that is configured to determine whether the user is touching the primary robot 20. If the determination unit determines that the user is not touching the primary robot 20, the control unit 26 may cause the posture of the primary robot 20 to be the same as the posture of the secondary robot 30. For example, the primary robot 20 may include the determination unit that is configured to determine whether the user is touching the primary robot 20. The determination unit determines whether the user is touching the primary robot 20, for example, on the basis of results of detection by capacitive sensors or the like provided to the arm 22. Then, if the determination unit determines that the user is not touching the primary robot 20, the control unit 26 may cause the posture of the primary robot 20 to be the same as the posture of the secondary robot 30. In this case, the process of S30 in FIG. 9 may be executed as a process of determining whether the user is touching the primary robot 20, or the process of determining whether the user is touching the primary robot 20 may be executed between the process of S17 and the process of S18 in FIG. 5.

According to the above-described configuration, if the user is not touching the primary robot 20, the posture of the primary robot 20 is caused to be the same as the posture of the secondary robot 30. Meanwhile, if the user is touching the primary robot 20, the control to cause the posture of the primary robot 20 to be the same as the posture of the secondary robot 30 is not performed. The touching to the primary robot 20 by the user can be the intention of the user to operate the primary robot 20 or to maintain the posture of the primary robot 20. Thus, under the state in which the user is touching the primary robot 20, the posture of the primary robot 20 can be suppressed from being changed to the posture that is not intended by the user. As a result, the user can be prevented from feeling a sense of discomfort.

In the process of S181 in FIG. 8, the limitation of the velocity at which the primary robot 20 is moved, specifically, the velocity at the time of moving the control point to the velocity limit Vu or lower may be omitted. In addition, in the process of S181 in FIG. 8, the limitation of the acceleration rate at which the primary robot 20 is moved, specifically, the acceleration rate at the time of moving the control point to the limited acceleration rate Au or lower may be omitted.

The inching mode need not necessarily be a mode in which the user inputs the fine-adjustment operations via the operating device 40, and may be the advanced control mode disclosed in Japanese Patent Application Laid-open No. 2019-55458.

At the time when the control unit 26 causes the primary robot 20 to make the discrepancy-elimination movement in response to the input of the discrepancy-elimination operation by the user to eliminate the discrepancy between the posture of the primary robot 20 and the posture of the secondary robot 30, the discrepancy may be eliminated by moving the primary robot 20 minimally straight. Also in this case, since the user has already instructed to cause the posture of the primary robot 20 to be the same as the posture of the secondary robot 30, the user can be prevented from feeling a sense of discomfort.

A single control unit that is configured to control the primary robot 20 and the secondary robot 30 may be provided instead of the control units 26 and 36 to the primary robot 20 or the secondary robot 30.

The primary robot 20 and the secondary robot 30 may be robots that have the same shape and are different from each other only in size. Alternatively, the primary robot 20 and the secondary robot 30 may be robots that have the same shape and the same size.

In the example described above in this embodiment, the results of the fine-adjustment operations are the history of the fine-adjustment operations. However, the results of the fine-adjustment operations may be other information as long as the postures after the fine-adjustment operations can be specified. For example, the results of the fine-adjustment operations may be information indicating the posture of the secondary robot 30 after the fine-adjustment operations (such as the respective angles of the axes), or may be a difference of the posture of the secondary robot 30 before and after the fine-adjustment operations (such as amounts of the changes of the respective angles of the axes).

What is claimed is:

1. A primary-and-secondary robot system comprising:
   a primary robot whose posture is changed by external force applied by a user;
   a secondary robot whose posture is controlled to be the same as the posture of the primary robot; and
   a computer that is configured to control the primary robot and the secondary robot, the computer including a processor and a memory,
   wherein the processor is configured to:
      perform a control to cause the posture of the secondary robot to be the same as the posture of the primary robot;
      control the posture of the secondary robot in response to fine-adjustment operations by the user, under a state in which the control to cause the posture of the secondary robot to be the same as the posture of the primary robot is stopped;
      cause the posture of the primary robot to be the same as the posture of the secondary robot in eliminating a discrepancy between the posture of the primary robot and the posture of the secondary robot; and
      limit an acceleration rate of a movement of the primary robot to a limited acceleration rate or lower in causing the posture of the primary robot to be the same as the posture of the secondary robot.

2. The primary-and-secondary robot system according to claim 1,
   wherein the processor is configured to limit a velocity of the movement of the primary robot to a velocity limit or lower in causing the posture of the primary robot to be the same as the posture of the secondary robot.

3. The primary-and-secondary robot system according to claim 1, wherein the processor is configured to:
   determine whether the user is applying the external force to the primary robot; and
   cause, if it is determined that the user is not applying the external force to the primary robot, the posture of the primary robot to be the same as the posture of the secondary robot.

4. The primary-and-secondary robot system according to claim 1, wherein the processor is configured to:
   determine whether the user is touching the primary robot; and cause, if it is determined that the user is not touching the primary robot, the posture of the primary robot to be the same as the posture of the secondary robot.

5. The primary-and-secondary robot system according to claim 1, wherein the processor is configured to:
control the posture of the secondary robot in response to fine-adjustment operations by the user and cause the memory to store results of the fine-adjustment operations, under a state in which the control to cause the posture of the secondary robot to be the same as the posture of the primary robot is stopped; and
cause the posture of the primary robot to be the same as the posture of the secondary robot on a basis of the stored results.

6. The primary-and-secondary robot system according to claim 5, wherein the processor is configured to:
determine whether the user is applying the external force to the primary robot;
interrupt, if it is determined that the user is applying the external force to the primary robot while the control to cause the posture of the primary robot to be the same as the posture of the secondary robot is being performed, the control to cause the posture of the primary robot to be the same as the posture of the secondary robot; and
restart, if it is determined that the user is not applying the external force to the primary robot after the interruption, from a time point of the interruption, the control to cause the posture of the primary robot to be the same as the posture of the secondary robot.

7. The primary-and-secondary robot system according to claim 1, further comprising
an operating device that is configured to be inputted with fine-adjustment operations by the user under a state in which the control to cause the posture of the secondary robot to be the same as the posture of the primary robot is stopped,
wherein, if an amount of a discrepancy between the posture of the primary robot and the posture of the secondary robot has exceeded a preset amount,
the processor is configured to cause a notifier to notify that the amount of the discrepancy has exceeded the preset amount, and
the operating device instructs the processor to cause the posture of the primary robot to be the same as the posture of the secondary robot.

8. The primary-and-secondary robot system according to claim 7,
wherein the processor is configured to suppress the posture of the primary robot from being changed by the external force applied by the user while the user is performing the fine-adjustment operations with use of the operating device.

* * * * *